United States Patent
Pattusamy et al.

(10) Patent No.: US 7,573,603 B2
(45) Date of Patent: Aug. 11, 2009

(54) IMAGE DATA PROCESSING

(75) Inventors: Purushothaman Pattusamy, Woodlands Crescent (SG); Peter Ngee Ching Lim, Summer Gardens (SG)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 1035 days.

(21) Appl. No.: 10/682,668

(22) Filed: Oct. 9, 2003

(65) Prior Publication Data

US 2004/0070791 A1    Apr. 15, 2004

(30) Foreign Application Priority Data

Oct. 11, 2002    (SG)    ............................. 200206214-9

(51) Int. Cl.
- G06F 15/00    (2006.01)
- H04N 1/04    (2006.01)
- B41J 2/325    (2006.01)

(52) U.S. Cl. .................. 358/1.3; 358/1.4; 358/497; 347/174

(58) Field of Classification Search .............. 358/1.8, 358/1.9, 3.02, 3.09, 1.18, 502, 501, 530, 358/1.3, 1.4, 1.15, 497; 347/139, 174
See application file for complete search history.

(56) References Cited

U.S. PATENT DOCUMENTS

| | | | | |
|---|---|---|---|---|
| 6,017,113 A | * | 1/2000 | Nicoloff et al. | 347/40 |
| 6,124,945 A | * | 9/2000 | Ishihara et al. | 358/1.9 |
| 6,124,946 A | * | 9/2000 | Norton | 358/1.9 |
| 6,155,670 A | * | 12/2000 | Weber et al. | 347/43 |
| 6,179,407 B1 | * | 1/2001 | Bockman | 347/40 |
| 6,213,579 B1 | * | 4/2001 | Cornell et al. | 347/14 |
| 6,509,978 B1 | * | 1/2003 | Szumla | 358/1.8 |
| 6,530,645 B2 | * | 3/2003 | Haflinger | 347/41 |
| 7,066,570 B1 | * | 6/2006 | van Doorn et al. | 347/40 |
| 7,365,888 B2 | * | 4/2008 | Yokochi | 358/482 |
| 2003/0030824 A1 | * | 2/2003 | Ogasahara et al. | 358/1.8 |
| 2006/0146090 A1 | * | 7/2006 | Fellingham et al. | 347/41 |
| 2007/0153302 A1 | * | 7/2007 | Lin et al. | 358/1.4 |

* cited by examiner

*Primary Examiner*—Jerome Grant, II

(57) ABSTRACT

A method and apparatus for processing image data are disclosed. The method includes the step of partitioning the image data into a plurality of data portions (μPage) for processing. Each data portion comprises a plurality of rows of pixels corresponding to at least one print swath height. The data portions are processed in a plurality of intermediate processing stages. The data portions are processed sequentially. The number of pixels per row of a data portion is determined to be just large enough ensure adequate output printing data for a given print head at all times. The processed data is then delivered to the print head in a just-in-time manner (JIT). An apparatus for processing the image data comprises an Application Specific Integrated Circuit (ASIC).

11 Claims, 5 Drawing Sheets

IMAGE DATA PROCESSING

FIELD OF THE INVENTION

The present invention relates generally to the field of image data processing, and in one form to the processing of image data for printing or other means of rendering images.

BACKGROUND

Image processing architectures typically involve a number of processing stages for executing image processing, including enhancing algorithms such as half toning, depletion, error diffusion and edge smoothing. The conventional approach is that a portion of image data is completely processed by each stage before the next portion of image data can be processed. The conventional architecture makes extensive use of external memory to store and retrieve intermediate data. The intermediate data is retrieved for processing in successive stages, which necessitates frequent access of a large amount of external memory. This, in turn, dictates a need for expensive, high-speed memory. Furthermore, the large amount of data processed by the intermediate stages prevents design of a simple pipeline with internal memory. One such conventional arrangement is shown in FIG. 1.

Conventional image processing architectures, such as are used in computer printer engines, generally exhibit a number of other disadvantages, such as requiring the addition of pre-processing stages that progressively increase total processing time and reduce image processing speed.

The present invention seeks to overcome or at least reduce one or more of the problems in the prior art.

SUMMARY

The gist of the present invention involves defining a data portion of at least one physical print swath in height.

The invention discloses a method for processing image data. Image data is partitioned into a plurality of data portions. Each data portion comprises a plurality of rows of pixels corresponding to at least one print swath height. The data portions are sequentially processed in a plurality of intermediate processing stages to generate output print data.

The invention further discloses an apparatus for processing image data. The apparatus has processing means for partitioning the image data into a plurality of data portions. Each data portion comprises a plurality of rows of pixels corresponding to at least one print swath height. A plurality of intermediate processing stages sequentially process the data portions.

The intermediate processing stages can simultaneously process a different one of the partitioned data portions. In some embodiments the data processed by each intermediate stage is stored in dedicated memory of the respective intermediate stages. The number of pixels within each row of each data portion is chosen to be just large enough to ensure adequate output printing data for a given print head at all times.

The intermediate processing stages can be scheduled to process the data portions and deliver processed data to a final stage just-in-time for rendering on print media.

In some embodiments the apparatus for processing image data comprises an Application Specific Integrated Circuit (ASIC).

The invention yet further discloses a printer and method for printing.

DESCRIPTION OF THE DRAWINGS

Features and preferred embodiments of the present invention are hereinafter described with reference to the accompanying drawings in which.

DETAILED DESCRIPTION

The principles of the method and apparatus for image data processing described herein have general applicability to computer printers having an array-type print head, and particularly to inkjet printers.

A print swath height is determined by the number of pixels arranged in a vertical column in a physical print head and different print heads may result in different swath heights. The height of a print swath thus represents the vertical height that can be printed by a single horizontal pass of a corresponding print head.

For purposes of this document, a micro page (or μPage) is defined as a portion of data of height one print swath or higher and an arbitrary number of columns' width. Although arbitrary, the number of columns in a μpage should be as small as possible to minimise storage memory requirements while, at the same time, of sufficient number to ensure sufficient data throughput. Specifically, the number of columns should be as small as possible to minimise dedicated memory size of the processing stages of the image processing architecture, but also of sufficient number to ensure that the final stage (e.g. nozzle or pen interface stage) will not be starved of data of a current μPage, while another μPage is being processed. In other words, the architecture needs to be able to supply data at a rate equal or faster than data consumed by the firing rate of the printer pin-head.

It will always be the case that other processes compete for memory bandwidth (e.g. CPU and I/O devices). Such processes impede the pipeline architecture memory access. The longest time such a temporary blockage can last is called pipeline memory access latency. This latency, together with the time it takes to generate the next μPage, must be lower than the time it takes to deplete the current μpage data. A rule of thumb approach is to keep the total latency at 25% to 50% of the time it takes the print head to deplete the current μPage data.

Figure 1:
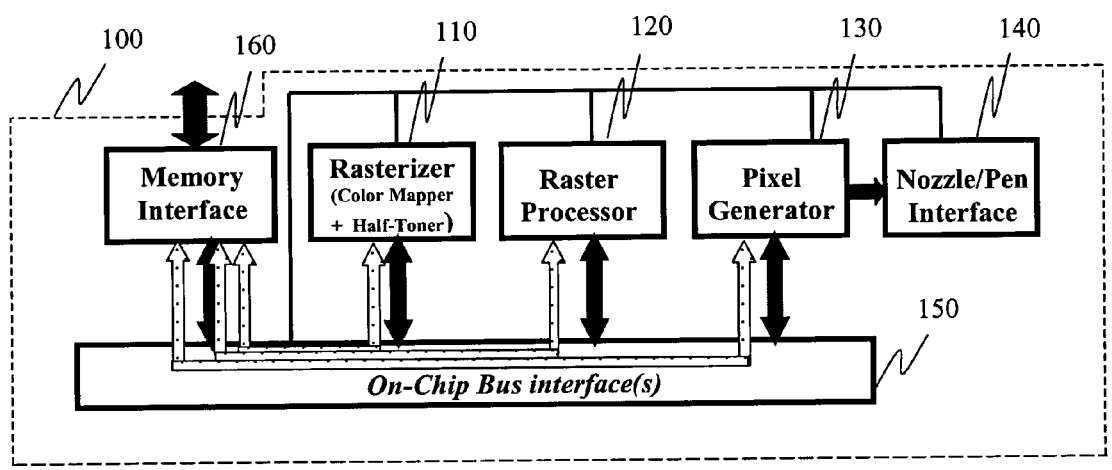
FIG. 1 is a block diagram of a conventional architecture for an image processing system.
Figure 2:
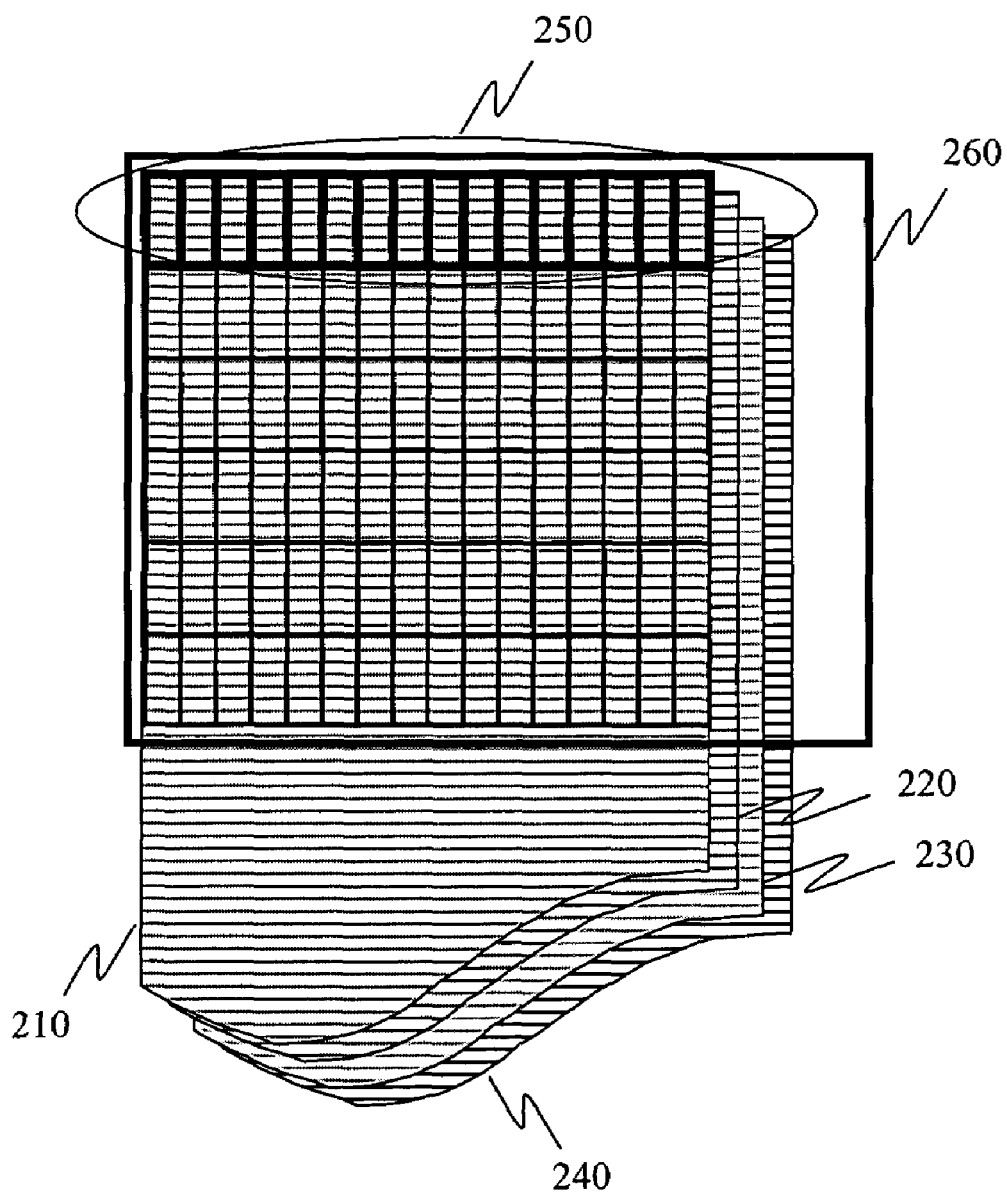
FIG. 2 shows data processing according to the image processing system of FIG. 1.

Before proceeding with a description of the embodiments of the present invention, a conventional image processing architecture is first described, with reference to FIGS. 1 and 2, to assist in better understanding the present invention.

Conventional Architecture

FIG. 1 shows a block diagram of a typical conventional architecture for an image processing system. Various conventional implementations may have a fewer or greater number of stages of image processing.

The system includes a rasterizer 110, a raster processor 120, a pixel generator 130, a pen interface 140, one or more on-chip bus interfaces 150 and a memory interface 160, all of which can be implemented in an Application Specific Integrated Circuit (ASIC) 100. Image data enters the ASIC 100 from external memory (not shown) via the memory interface 160 and the on-chip bus interfaces 150. The image data is processed by the various intermediate stages 110-130, which each receive their respective input data from the external memory and store their respective output data in the external memory, via the memory interface 160 and the on-chip bus interfaces 150. Finally, the pixel generator 130 provides data to the nozzle or pen interface 140.

Example of Data Flow and Storage Using the Conventional Architecture

The following image processing example demonstrates the data flow and storage requirements relative to each of the intermediate processing stages of the conventional architecture shown in FIG. 1. Assuming the following:

| Image size: | 7.0" × 8.5" |
|---|---|
| Image Resolution: | 600 dpi (dpi = dots per inch) |
| Print head type: | 600 dpi, 256 Nozzles |
| Half tone resolution: | 4 bit |
| Firing rate: | 16 KHz |
| Colors: | 4 |

Rasterizer

The data is processed on a row-by-row basis by the rasterizer 110. The rasterizer 110 reads aRGB or RGBa data from the external memory and converts the image data to CMYK raster data. aRGB and RGBa refer to a 32-bit colour representation specifying red, green and blue components. CMYK is similarly a 32-bit representation for cyan, magenta, yellow and black colour components. These representations are pre-defined color spaces well known in the relevant art.

$$\frac{\text{No. of dots}}{\text{per pixel row}} = \text{paper\_horizontal\_size} * dpi \quad (1)$$
$$= 7.0 * 600$$
$$= 4,200$$

$$\text{Data per pixel row} = \text{no. of dots per row} * \text{no. of colors} \quad (2)$$
$$= 4,200 * 4$$
$$= 16,800 \text{ Bytes}$$

CMYK image data is converted to 4-bit half-toned image data by the rasterizer 110, a process which generates quantization. Many half-tone algorithms diffuse the error in both the forward and downward directions. Thus, the error information needs to be stored in memory for subsequent retrieval and use when processing the next row of the image. Typically, one byte of diffusion error is generated, per pixel, per color (CMYK). The total amount of diffusion error data thus equals the number of pixels multiplied by the number of colors.

$$\frac{\text{Diffusion data}}{\text{written per row}} = \text{no. of pixels} * \text{no. of colors} \quad (3)$$
$$= 4,200 * 4$$
$$= 16,800 \text{ Bytes}$$

$$\frac{\text{Diffusion data}}{\text{read per row}} = \text{no. of pixels} * \text{no. of colors} \quad (4)$$
$$= 4,200 * 4$$
$$= 16,800 \text{ Bytes}$$

$$\frac{\text{Half-toned image data}}{\text{generated per row}} = 4,200 * 4 / 2 \quad (5)$$
$$= 8,400 \text{ Bytes}$$

$$\begin{aligned}\text{Thus, the total intermediate} \\ \text{data stored in the external} \\ \text{memory per row}\end{aligned} = (3) + (5) \quad (6)$$
$$= 16,800 + 8,400$$
$$= 25,200 \text{ Bytes}$$

$$\begin{aligned}\text{Total intermediate} \\ \text{data stored on the} \\ \text{memory per swath}\end{aligned} = \text{halftoned\_CMYK} + \text{diffusion\_data\_two\_rows} \quad (7)$$
$$= [(5) * 256] + [(3) * 2]$$
$$= [8,400 * 256] + [16,800 * 2]$$
$$= 2,184,000 \text{ Bytes}$$
$$= \sim 2.1 \text{ MB}$$

$$\begin{aligned}\text{Total data written} \\ \text{and read per row}\end{aligned} = RGB \text{ data} + \text{Diffusion\_write} + \quad (8)$$
$$\text{Diffusion\_read} + \text{halftoned\_CMYK\_data}$$
$$= (2) + (3) + (4) + (5)$$
$$= 16,800 + 16,800 + 16,800 + 8,400$$
$$= 58800 \text{ Bytes}$$

$$\begin{aligned}\text{Total data read and} \\ \text{written per swath}\end{aligned} = (8) * 256 \quad (9)$$
$$= 15,052,800 \text{ Bytes}$$
$$= \sim 15 \text{ MB}$$

Raster Processor

The raster processor 120 waits until some predefined number of rows have been processed by the rasterizer 110, typically 16, before commencing with processing. The raster processor 120 rotates the predefined number of rows to nozzle or pen-oriented vertical bit columnized data called microband. The microband enables application of enrichment algorithms such as depletion.

FIG. 2 shows color planes 210, 220, 230 and 240 that correspond to the 4 printer colors and each comprise horizontal rows of rasterized pixels. An exemplary data swath 260 of one pen column high consists of a number of horizontal raster rows, each of which is a number of columns wide. The data swath 260 includes a number of microbands. An exemplary microband 250 comprises a group of 16 rasters.

$$\frac{\text{Total data read}}{\text{per microband}} = \text{CMYK\_data\_per\_row} * 16$$
$$= 8,400 * 16$$
$$= 134,400 \text{ Bytes}$$

-continued $$\text{Total data generated per microband} = CMYK\_data\_per\_row * 16$$
$$= 8,400 * 16$$
$$= 134,400 \text{ Bytes}$$

$$\text{Total data generated per swath} = 134,400 * 16 \quad (10)$$
$$= 2,150,400$$
$$= \sim 2.1 \text{ MB}$$

$$\text{Total Data read and written per swath} = (data\_read + data\_generated \quad (11)$$
$$\text{per microband}) * 16$$
$$= 4,300,800$$
$$= \sim 4.2 \text{ MB}$$

Pixel Generator

The pixel generator 130 reads the number of microbands required to build a swath of pixels and generates the pixel data for delivery to the nozzles or pens. The pixel data is written directly to the internal pixel memory used by the nozzle or pen interface 140. The operation can only start once a required number of microband shave been processed by the raster processor 120. It is unnecessary to generate binary pixel data for the entire swath before sending the data to the nozzles or pens for firing. As soon as sufficient binary pixel data is generated to fire few times, the data can be pumped to the nozzles or pens. The amount of intermediate data is small enough to be kept in internal memory. The only external memory access necessary is to read the microband data generated by the raster processor 120 (i.e. the previous stage). If the resolution is not multiplied in the raster processor 120, then:

$$\text{Data read} = \sim 2.1 \text{ MB per swath} \quad (12)$$

Conclusion $$\text{The total transferred between external memory} = (9) + (11) + (12) \quad (13)$$
$$\text{and the ASIC 100}$$
$$= 15 + 4.2 + 2.1$$
$$= 21.3 \text{ MB}$$

$$\text{The total intermediate data stored} = (7) + (10) \quad (14)$$
$$= 2.1 + 2.1$$
$$= 4.2 \text{ MB}$$

According to the above analysis, it can be seen that the intermediate data generated by the various stages of the conventional image processor, for the example given, amounts to about 4 MB. This demands that the data be stored in external memory.

A full swath is processed completely before subsequent processing of the successive swath can be undertaken.

PREFERRED EMBODIMENT

Below described is an embodiment of an image processing architecture according to the present invention.

As discussed earlier, a μPage is defined, and each such set of data is processed by the cascaded stages on a μPage-by-μPage basis, obviating the need to store large amounts of data. The μPage size (height×width), is determined arbitrarily. The height is at least one print swath height's worth. The width is determined in consideration of the amount of available dedicated memory and overall system efficiency. For example, in a system where a burst length of 8 double words will yield the best efficiency for external memory access, a 256×8 μPage might be used. Thus, each μPage will consist of 2048 pixels.

Figure 3:
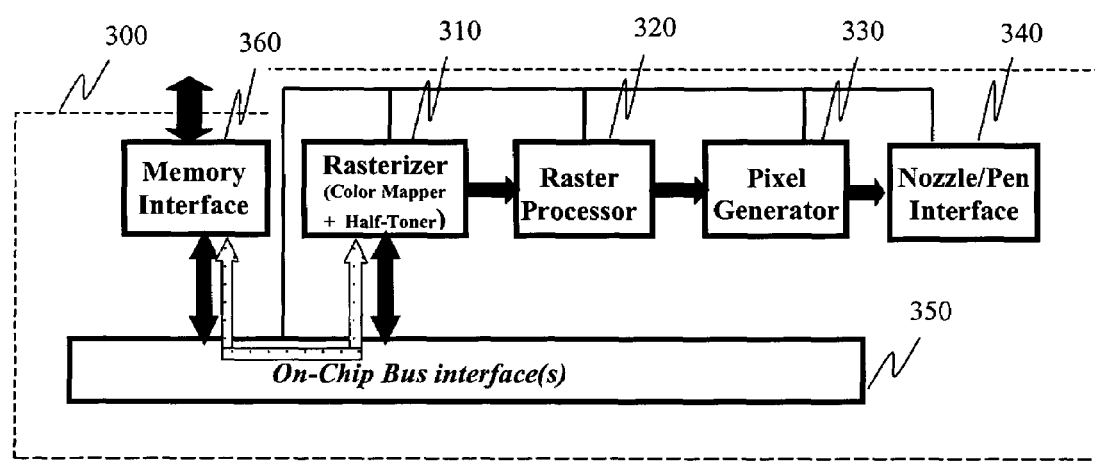
FIG. 3 is a block diagram of an architecture for an image processing system according to an embodiment of the present invention.

FIG. 3 shows a block diagram of an image processing architecture according to an embodiment of the present invention.

The system includes a rasterizer 310, a raster processor 320, a pixel generator 330, a nozzle or pen interface 340, one or more on-chip bus interfaces 350 and a memory interface 360. In some embodiments the rasterizer 310, the raster processor 320, the pixel generator 330, the nozzle or pen interface 340, the one or more on-chip bus interfaces 350 and the memory interface 360 are embodied in an Application Specific Integrated Circuit (ASIC) 300. Image data enters the ASIC 300 from external memory (not shown) via the memory interface 360 and the on-chip bus interfacess 350. The image data is processed by the various intermediate stages 310-330, which receive their input data directly from the previous stages, respectively. Similarly, the various intermediate stages 310-330 store their respective output data in their respective dedicated memory. In some embodiments the dedicated memory is physically located within each of the intermediate stages 310-330. The pixel generator 330 provides data to the pen interface 340. Apart from the rasterizer 310 receiving the image data from external memory via the memory interface 360 and the on-chip bus interfaces 350, no other data transfer or storage occurs externally to the ASIC 300.

Figure 4:
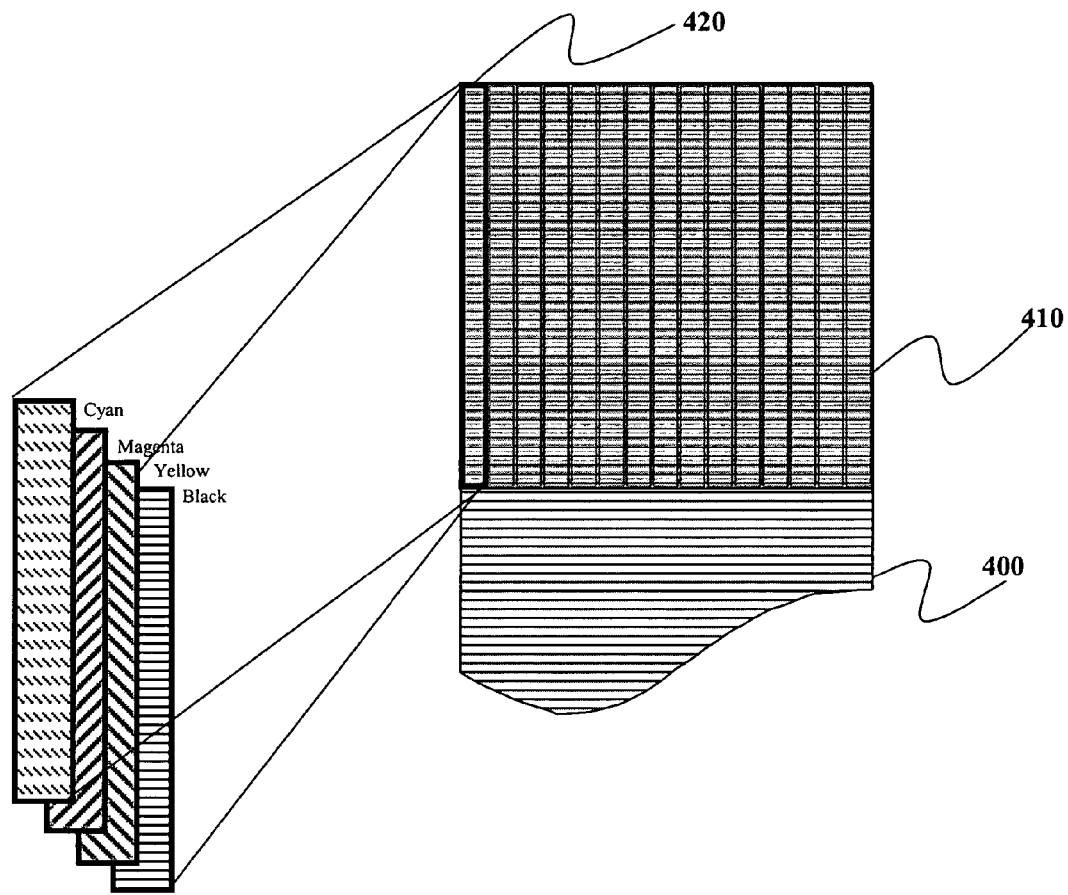
FIG. 4 shows data processing according to the image processing system of FIG. 3.

FIG. 4 shows an image page broken up into smaller μPages. The image page 400 includes a full page-width swath 410 that comprises 16 μPages, each of one swath height. An exploded view of one μPage 420 is shown, of one such μPage, which is of swath height and a few pixel columns width.

The μPage boundaries are such that all image-processing relating to a specific μPage can be completed without making forward reference to μPages still to be processed. This advantageously enables pipelining of the intermediate image processing stages, thus enabling each of the intermediate stages to simultaneously process a different one of the μPages.

Just-In-Time (JIT) printing requires processing of the μpages in the pipeline to be scheduled to deliver the final print data to the nozzles or pens just before the data is actually required. This results in a significantly reduced amount of intermediate data generated, thus enabling the data to be stored in the dedicated memory of a particular intermediate stage of the ASIC 300. Consequently, the data-flow architecture of embodiments of the present invention can result in a significant increase in print speed and a significant reduction in the amount of external memory required. In addition, the lead time to begin printing is also reduced.

The disclosed architecture does not materially change the way the intermediate stages function. Certain minor changes are required to the memory interface of the intermediate processing stages to enable data access to and from the dedicated memory, rather than external memory. Changes to the processing algorithms (such as color mapping) that may deteriorate image quality are avoided.

Example of Data Flow and Storage

The following image processing example demonstrates the data flow and storage requirements relative to each of the intermediate processing stages of the architecture shown in FIG. 3. Assuming the same specifications as per the foregoing conventional example:

| Image size: | 7.0" × 8.5" |
|---|---|
| Image Resolution: | 600 dpi (dpi = dots per inch) |
| Print head type: | 600 dpi, 256 Nozzles |
| Halftone resolution: | 4 bit |
| Firing rate: | 16 KHz |
| Colors: | 4 |

For these specifications, one column of data would be consumed by the print head every 16 KHz clock period=62.5 µs. If the pipeline memory access latency is, say, 100 µs (including the time it takes to generate the next µPage), a suitable µPage width would be based on 100 µs/25% (or/50%) =400 µs (or 200 µs). The width is 400 µs/62.5 µs/column=6.4 (or 3.2). Rounded this is 7 columns (or 4 columns). In the present example the µPage is chosen to be of dimension 256×8, which matches a total latency of closer to 125 µs.

Rasterizer

RGB image data is input to the rasterizer 310 from external memory via the memory interface 310 and the on-chip bus interface 350. The RGB data is converted to half-toned CMYK data.

Diffusion data for the last row of each µPage generated during processing of each swath is stored in the external memory when processing of that swath is completed. At the start of processing of the next swath, this stored diffusion data is retrieved from the external memory. So, for every swath, it is necessary to read and write diffusion error data to and from the external memory for one row. If only forward error diffusion is used, use of external memory may not be necessary. If this diffusion data generated is small enough to fit into the dedicated memory the implementer may also choose not to use external memory.

$$RGB \text{ data transferred from the external memory per swath} = (2) * 256 \quad (15)$$
$$= 16,800 * 256$$
$$= 4,300,800 \text{ Bytes}$$

Intermediate Data Generated:

$$\text{Diffusion data per µPage row} = \text{no\_of\_dots\_per\_µRow} * \text{no of colors}. \quad (16)$$
$$= 8 * 4$$
$$= 32 \text{ Bytes}$$

-continued $$CMYK \text{ data} = \text{no\_of\_pixels\_per\_µPage} * \quad (17)$$
$$\text{no\_of\_colors} * \text{bits\_per\_colors}/8$$
$$= 2048 * 4 * 4/8$$
$$= 4092 \text{ Bytes}$$

$$\text{Total data transferred to and from external memory} = (15) + \text{diffusion\_data\_for\_one\_row} * 2 \quad (18)$$
$$= 4,300,800 + 16800 * 2$$
$$= 4,334,400$$
$$= \sim 4.3 \text{ MB}$$

Raster Processor

The raster processor 320 may start the bit columnization as soon as a predetermined number of rows (e.g. 16 rows) have been processed by the rasterizer 310. Since the storage requirement in internal memory is not so high, raster processing may begin after the rasterizer 310 completes one µPage. Thus, there is an internal storage requirement for two µPages between the rasterizer 310 and the raster processor 320.

The amount of data output from the raster processor 320 is the same as the amount of data input to the raster processor 320, namely 2,048 pixels, unless the resolution is multiplied. If the resolution is multiplied, 4K pixels per µPage will be output from the raster processor 320.

$$\text{Data generated per µPage} = 4,092 * 4 * 4/8 \quad (19)$$
$$= 8,192 \text{ Bytes}$$

No external memory access is necessary if this data is stored internally.

In addition to columnization, other processes like edge smoothing or depletion can be performed by the raster processor stage 320. In certain cases, it may be desirable to accumulate data of between one and all of the columns of the preceding µPage before performing these processes. This requires more internal memory, irrespective of the architecture, and will add some very small latency to the process. The new architecture does not, however, demand any changes to edge smoothing, depletion, or other such algorithms.

Pixel Generator

The pixel generator 330 functions in the same way as in the conventional architecture, except that the data is read from internal memory instead of external memory. Binary nozzle or pen data can be generated as soon as one µpage has been processed by the raster processor 320. It may be necessary to provide internal storage space for two µPages so that the raster processor 320 can operate on one µPage while the pixel generator 330 operates on the previous µPage.

Figure 5:
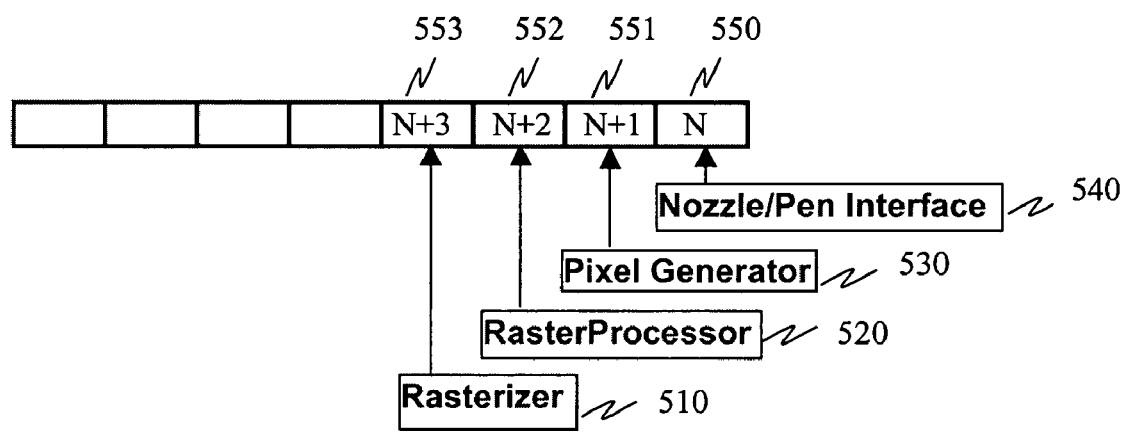
FIG. 5 shows data flow through different stages of the image processing system of FIG. 3.

FIG. 5 shows data flow through intermediate processing stages 510 . . . 540 in the pipeline. The first μPage 550 is processed by the pen interface stage 540, the second μPage 551 is processed by the pixel generator stage 530, the third μPage 552 is processed by the raster processor stage 520 and the fourth μPage 553 is processed by the rasterizer stage 510. The pipelined architecture permits processing of the μPages 550 . . . 553 by the intermediate stages 510 . . . 540 simultaneously.

A further advantage of this architecture is that more process stages can be introduced in the pipeline. This will just add a μPage latency to the process but will not reduce the processing performance.

Memory Requirements:

$$\text{Rasterizer to Raster Processor interface} = 4{,}092 * 2 \text{ 2 μPages} \quad (20)$$
$$= 8{,}192 \text{ Bytes}$$

$$\text{Raster Processor to Pixel Generator interface} = 8{,}192 * 2 \text{ 2 μPages (double resolution)} \quad (21)$$
$$= 16{,}382 \text{ Bytes}$$

$$\text{Total internal storage required} = (20) + (21) \quad (22)$$
$$= 24{,}576 \text{ Bytes}$$
$$= \sim 24 \text{ KB}$$

$$\text{Total external data transfer per swath} = (18) \quad (23)$$
$$= \sim 4.3 \text{ MB}$$

Data Transfer rate with the specified image size, print head size and firing rate (7", 600 dpi, 16000 Hz):

$$\text{Maximum printing rate} = 4{,}200 / 16{,}000 \quad (24)$$
$$= 263 \text{ ms per swath}$$

$$\text{No. of swaths printed per page} = 8.5 * 600 / 256 \quad (25)$$
$$= 20 \text{ (rounded off)}$$

$$\text{Max. Pages Per Minute (PPM)} = 60 / [0.263 * 20] \quad (26)$$
$$= 11.4$$

Considering overheads such as vertical paper movement, it may be possible to achieve 10 PPM.

$$\text{At 10 PPM, the time needed to print one page} = 60/10 \quad (27)$$
$$= 6 \text{ secs}$$

$$\text{Time to print one swath} = 6/20 \quad (28)$$
$$= 300 \text{ ms}$$

$$\text{No. of pixels per swath} = 4{,}200 * 256 \quad (29)$$
$$= 1{,}075{,}200$$

$$\text{Time to process one pixel} = 300 * 1{,}000 * 1{,}000 / 1{,}075{,}200 \text{ ns} \quad (30)$$
$$= 279 \text{ ns}$$

Conventional systems require less than 10 clocks, per pixel, per stage. Accordingly, the process speed is not limited by the individual stages.

$$\text{Data transfer rate per swath using the conventional architecture} = \text{Total Data transferred/time to print one swath} \quad (31)$$
$$= 21.3 / 0.3$$
$$= 71 \text{ MB per sec}$$

$$\text{Data transfer rate per swath using the pipelined } \mu Page \text{ architecture} = \text{Total Data transferred/time to print one swath} \quad (32)$$
$$= 4.3 / 0.3$$
$$= 14.3 \text{ MB per sec}$$

If 50% of the 71 MB per sec external memory bandwidth is available to the pipelined μPage architecture, it is possible to process the images at 25 PPM.

TABLE 1

Comparison between the conventional architecture and pipelined architecture with μPages.

| | Conventional Architecture | Pipelined Arch. with μPages | Comments |
|---|---|---|---|
| Internal storage required per swath (if pipelined) | 4.2 MB | 24 KB | 5.3% of the current architecture |
| Total external data transfer per swath | 21.3 MB | 4.3 MB | |
| Data transfer rate to the external memory | 71 MB per sec | 14.3 MB per sec | For 10 PPM |
| Print/Processing Rate | 1X | 5X | For any given memory bandwidth. |
| Scalable | No | Yes | Additional processing stage does not demand complete redesign. |

CONCLUSION

From the foregoing Table 1, it can be seen that the pipelined architecture with μPages greatly reduces the external memory and bandwidth requirements. The intermediate data storage requirement between stages is significantly reduced, increasing the paper size (width) does not demand relatively larger memory resources and the time to process an image no longer limits the actual time to print.

An additional advantage is that the pipelined architecture is scalable. Adding another intermediate image-processing stage only increases processing latency and does not increase total image-processing time. Increasing the paper size (width) does not demand huge memory resources.

The foregoing describes only a few embodiments of a method and apparatus for high performance image processing, and changes can be made thereto without departing from the scope and spirit of the invention, the embodiments being illustrative and not restrictive.

The invention claimed is:

1. An apparatus for processing image data, comprising:
a processor that partitions a swath of said image data into a plurality of data portions, each comprising a plurality of rows of pixels corresponding to at least one print swath height; and
a plurality of intermediate processing stages for sequentially processing said data portions,
wherein each of said intermediate processing stages include a cascaded arrangement of a rasterizer, a raster processor and a pixel generator, and wherein each of said intermediate processing stages simultaneously processes a different sequential one of said partitioned data portions.

2. The apparatus of claim 1, further including a memory means that stores the data processed by each intermediate stage, said memory being dedicated to said intermediate processing stages.

3. The apparatus of claim 2, wherein the number of pixels within each row of each of said data portions is chosen to be just large enough to ensure adequate output printing data for a given print head at all times.

4. The apparatus of claim 1, further including means for rendering the processed image data on print media.

5. The apparatus of claim 1, further including processing means for scheduling processing of said data portions by said intermediate processing stages to deliver processed data to a final processing stage just-in-time for rendering.

6. The apparatus of claim 1, wherein each of the intermediate processing stages is implemented by an Application Specific Integrated Circuit (ASIC).

7. A printer, comprising:
processing means for partitioning a swath of image data into a plurality of data portions, said data portions comprising a plurality of rows of pixels corresponding to at least one print swath height;
a plurality of intermediate processing stages for sequentially processing said data portions to generate output print data; and
a print head sequentially receiving said processed data portions,
wherein said intermediate processing stages include a cascaded arrangement of a rasterizer, a raster processor and a pixel generator that simultaneously process a different sequential one of said partitioned data portions.

8. The printer of claim 7, further including memory means for storing the data processed by each intermediate stage, said memory means being dedicated to said intermediate stages.

9. The printer of claim 8, wherein the number of pixels within each row of each said data portion is chosen to be just large enough to ensure adequate output printing data for a given print head at all times.

10. The printer of claim 7, further including means for rendering the processed image data on print media.

11. The printer of claim 7, further including processing means for scheduling processing of said data portions by said intermediate processing stages to deliver processed data to a final processing stage just-in-time for rendering.

* * * * *